United States Patent [19]
Taylor et al.

[11] Patent Number: 5,956,083
[45] Date of Patent: Sep. 21, 1999

[54] CAMERA AND METHOD FOR CAPTURING MOTION SEQUENCES USEFUL FOR INTEGRAL IMAGE ELEMENT FORMATION

[75] Inventors: Roy Yuille Taylor, Scottsville; Robert Louis Laperle, Rochester; Roland Robert Schindler, Pittsford, all of N.Y.

[73] Assignee: Eastman Kodak Company, Rochester, N.Y.

[21] Appl. No.: 08/741,417

[22] Filed: Oct. 29, 1996

[51] Int. Cl.⁶ .............................. H04N 5/76; H04N 5/225
[52] U.S. Cl. ............................................. 348/231; 348/220
[58] Field of Search ................................... 348/231, 157, 348/220, 3.32, 2.39, 3.33, 3.34, 3.31, 42, 49, 50, 152, 153, 154, 155; 359/619, 621, 623; 386/112, 117, 120; H04N 5/14

[56] References Cited

U.S. PATENT DOCUMENTS

| | | | |
|---|---|---|---|
| 4,468,708 | 8/1984 | Coleman, Jr. ............................ | 358/310 |
| 5,161,001 | 11/1992 | Pele et al. ............................... | 358/138 |
| 5,241,381 | 8/1993 | Kondo ..................................... | 358/133 |
| 5,241,401 | 8/1993 | Fujiwara et al. ........................ | 358/404 |
| 5,253,054 | 10/1993 | Fujiwara et al. ........................ | 358/133 |
| 5,367,343 | 11/1994 | Blair ........................................ | 348/700 |
| 5,384,598 | 1/1995 | Rodgriguez et al. ................... | 348/384 |
| 5,428,389 | 6/1995 | Ito et al. .................................. | 348/231 |
| 5,459,582 | 10/1995 | Takahashi ................................ | 386/112 |
| 5,481,307 | 1/1996 | Goldstein et al. ....................... | 348/384 |
| 5,483,279 | 1/1996 | Ishii ......................................... | 348/222 |
| 5,486,862 | 1/1996 | Yagasaki ................................. | 348/399 |
| 5,576,759 | 11/1996 | Kawamura et al. ..................... | 348/231 |
| 5,642,226 | 6/1997 | Rosenthal ................................ | 359/619 |
| 5,720,123 | 2/1998 | Taylor ..................................... | 359/619 |
| 5,731,883 | 3/1998 | Morton et al. .......................... | 358/296 |
| 5,737,087 | 4/1998 | Morton et al. .......................... | 358/296 |

FOREIGN PATENT DOCUMENTS

| | | | |
|---|---|---|---|
| 0472806A2 | 4/1992 | European Pat. Off. ......... | H04N 5/14 |
| 5-130489 | 5/1993 | Japan . | |

*Primary Examiner*—Wendy Garber
*Assistant Examiner*—Luong Nguyen
*Attorney, Agent, or Firm*—Gordon M. Stewart; William F. Noval

[57] ABSTRACT

A camera for recording motion sequences which may be selected for forming an integral image. The camera includes an image capture device for capturing a scene action as a motion sequence of image frame signals; and a first storage device for storing the motion sequence. A comb subset of the motion sequence is selected; and a second storage device which may be the same or different from the first storage device, stores the selected comb subset of the motion sequence. A method of obtaining in a camera such as the foregoing camera, a set of images from which a lenticular motion image can be formed, is further provided.

18 Claims, 2 Drawing Sheets

CAMERA AND METHOD FOR CAPTURING MOTION SEQUENCES USEFUL FOR INTEGRAL IMAGE ELEMENT FORMATION

FIELD OF THE INVENTION

The invention relates generally to the field of integral imaging, and in particular to apparatus and methods for generating integral images which can display motion.

BACKGROUND OF THE INVENTION

Integral image elements which use a lenticular lens sheet, fly's eye lens sheet, or barrier strip sheet and a three-dimensional integral image aligned with the sheet, so that a user can view the three-dimensional image without any special glasses or other equipment, are known. Such imaging elements and their construction, are described in "Three-Dimensional Imaging Techniques" by Takanori Okoshi, Academic Press, Inc., New York, 1976. Integral image elements having a lenticular lens sheet (that is, a sheet with a plurality of adjacent, parallel, elongated, and partially cylindrical lenses) are often referenced as "lenticular image elements", and are also described in the following Unites States patents: U.S. Pat. No. 5,391,254; U.S. Pat. No. 5,424,533; U.S. Pat. No. 5,241,608; U.S. Pat. No. 5,455,689; U.S. Pat. No. 5,276,478; U.S. Pat. No. 5,391,254; U.S. Pat. No. 5,424,533 and others. Integral image elements with lenticular lens sheets use interleaved image slices which, in the case of a three-dimensional integral image, are vertical image slices (relative to the orientation in which the image is normally viewed) aligned with the lenticules so that a three-dimensional image is viewable when the lenticules are vertically oriented with respect to a viewer's eyes. The image may be conveniently laminated (that is, adhered) to an integral or lenticular lens sheet.

Similar integral image elements, such as described in U.S. Pat. No. 3,268,238 and U.S. Pat. No. 3,538,632, can be used to convey a number of individual two-dimensional scenes (such as unrelated scenes or a sequence of scenes depicting motion) rather than one or more three-dimensional images, or as in U.S. Pat. No. 4,870,768. It is well appreciated that different images on integral image elements can be viewed from different angles with respect to the element by the viewer moving relative to the element. It has also been disclosed in U.S. Pat. No. 3,562,941, to move a lenticular image with respect to a lenticular lens sheet so that different images could be viewed from the same location.

Additionally, motion sequences have been displayed on lenticular images since the 1950's when cereal companies utilized them as prizes packed in the cereal boxes as reward for purchasing their brands. The sequences were relatively simple and cartoon like, initially comprising only two views, such as an opening and closing eye, or a jumping jack. By the 1960's the incorporation of photographic images was possible in image sequences, usually utilizing the motion of the camera in a cross-field direction so that with the direction of lenticules oriented vertically, the viewer's eyes would see different views enabling him to see a stereoscopic image. The methods of producing these images were purely optical which is widely discussed in issued patents. Fundamentally, a printing plate was made from a composite image which had been made optically by projecting the various views through lenticular material onto the recording medium.

Improvements in photographic emulsions and plastics forming was reflected in continuing improvements to these basic concepts through the 1970's and 1980's. In the early 1990's trading cards appeared with two or three views of a differing nature, marketed by companies such as Skybox, and Topps. Eastman Kodak introduced several new refinements in the early 1990's which allowed the number of views to be greatly increased with better optical image quality, marketed as KODAMOTION images. The views were selected by a user reviewing either hard copy prints, or soft copy displays on a computer screen, a sequence of frames of a motion scene, and manually selecting those frames that were judged would provide a desirable motion image. The emphasis was placed on commercially marketable images of sports figures and advertising promotions where many copies are to be made.

Consumers and professional photographers often capture motion image sequence on camcorders (a portable combination of both video camera and video recorder), both conventional analog type and the more recently introduced digital type. However, while the captured sequences can be replayed in a tape player with attached monitor, no convenient method has been suggested to provide a hard copy (that is, a printed copy which does not require special viewing equipment to see) displaying a captured motion image.

It would be desirable then, to provide a means by which a consumer can readily obtain a hard copy of a motion image, thereby enhancing the memory of the event and extending his enjoyment of the final image.

SUMMARY OF THE INVENTION

The present invention recognizes that a hard copy of a motion image can be readily obtained by using image frames from the sequence of frames recorded in a camera capable of recording motion images (sometimes referenced as a "video camera" herein), as frames in a motion lenticular image. However, the present invention further realizes that this concept alone does not provide a consumer with a convenient means of obtaining a hard copy of a captured scene for a number of reasons.

First, a motion lenticular image element would only hold a limited number of frames of a motion image scene, for example 10 to 20 frames. This limited number of frames is viewed changing the angle of the element with respect to a viewer's eyes (such as by tilting the element) over a desirable time period, for example 1 or 2 seconds. On the other hand, a typical video camera might capture motion images at 30 frames per second ("fps") and in real time the motion sequence might last several seconds (making for a total of 90 or more frames for a captured motion image sequence). Therefore, replaying a captured video sequence at the normal rate does not provide an accurate indication as to how a lenticular image element produced from that captured scene will look, since the lenticular image element cannot hold all of the frames captured over the duration of the captured motion image. Furthermore, replaying in slow motion does not help since all captured frames will still then be viewed over a time period which is now longer than the period over which the lenticular image element would typically be tilted. In either case then, a realistic simulation of a final lenticular image element formed from the captured motion image, is not obtained. Thus, the present invention realizes that a way is needed to allow a user to determine, at the camera, if a captured motion scene will in fact produce a good lenticular image element, so that he may have the opportunity to capture another similar motion image scene.

Second, to obtain images of sufficiently high resolution for forming a motion lenticular image, a digital video camera would be best. The fact that the captured images are in digital format already allows for ready manipulation by interleaving image strips to form the lenticular image in a known manner. However, digital data of motion images requires a large amount of storage space, which on the other hand is preferably limited in order to make a portable camera with an included recorder ("camcorder") compact. The present invention realizes that for captured motion image sequences which are to be made into lenticular images, storage space requirements in a camcorder type camera could be reduced since only some of the frames will be used to create the typical motion lenticular image element, provided a means is available at the camera to allow a user to select only those frames which will produce a desirable motion lenticular image.

Third, the present invention realizes that storage space requirements for captured motion image scenes saved in the camera, can be further reduced by saving only those lines of each frame which will actually be used to form the motion lenticular image. This assists in maintaining camera portability.

The present invention then, provides a camera for recording motion sequences which may be selected for forming an integral image, comprising:

(a) image capture means for capturing a scene action as a motion sequence of image frame signals;
(b) a first storage means for storing the motion sequence;
(c) means for defining a comb subset of the motion sequence; and
(d) a second storage means which may be the same or different from the first storage means, for storing a selected comb subset of the motion sequence.

In one aspect the present invention provides a method of capturing and saving image frames for use in forming an integral image, using a camera of the present invention.

The present invention further provides in another aspect, a method of forming an integral image, comprising:

(a) selecting a frame of a comb subset of a motion sequence of image frame signals;
(b) automatically selecting the remaining frames of the comb subset based on a preselected number of frames permitted in the comb subset and a mathematical time relationship of the comb subset;
(c) sequentially displaying on a preview screen, the frames of the comb subset;
(d) generating a lenticular image by interleaving lines from the frames of the comb subset.

The invention allows an individual to create and view, at the camera, a good simulation of the final motion lenticular image, and therefore a chance to recapture the same or similar motion scene if desired. Further, in allowing only storage of the frames required for the final motion lenticular image, as well as just the necessary lines from each such frame, the invention allows reduction in image storage space requirements

BRIEF DESCRIPTION OF THE DRAWINGS

To facilitate understanding, identical reference numerals have been used, where possible, to designate identical elements that are common to the figures.

DETAILED DESCRIPTION OF THE INVENTION

It will be appreciated in the present invention, that while integral images could be formed for use with an integral lens sheet which could be a fly's eye lens sheet, the integral image will more typically be a lenticular image of interleaved image lines for viewing through a lenticular lens sheet, the assembly referenced as a lenticular image element, so that a motion image can be seen when tilted in one direction. While integral lens sheets, such as lenticular lens sheets, normally have curved surfaces on a front side (in the case of lenticular lens sheets, these are semi-cylindrical in shape), the integral lens sheet could alternatively have regions of varying indices of refraction through its volume configured in such a way as to provide (in conjunction with the surfaces of the sheet, such as a curved external surface, flat external surface or some other shape) the same optical deflection of light rays as would be provided by a conventional fly's eye or lenticular lens sheet. Also, the back surface of the lens sheet may also be curved so as to either strengthen the lens effect or compensate for the curved focal plain which may be inherent in the lens construction. Consequently, the curvature on the back side may be of such a shape as to match the curvature of the focal plain of the lens. Further, by an "integral" image is referenced an image composed of segments (lines, in the case of the particular case of a lenticular image element) from at least one complete image (and, in the case of a motion integral image element, more than one image). These segments will be aligned with respective individual lenses so that each of the one or more images is viewable when a user's eyes are at the correct angle relative to the imaging element. An "integral image element" (including a "lenticular image element") in the present case is used to refer to an integral image which has been aligned with a corresponding lens sheet for viewing.

Figure 1:
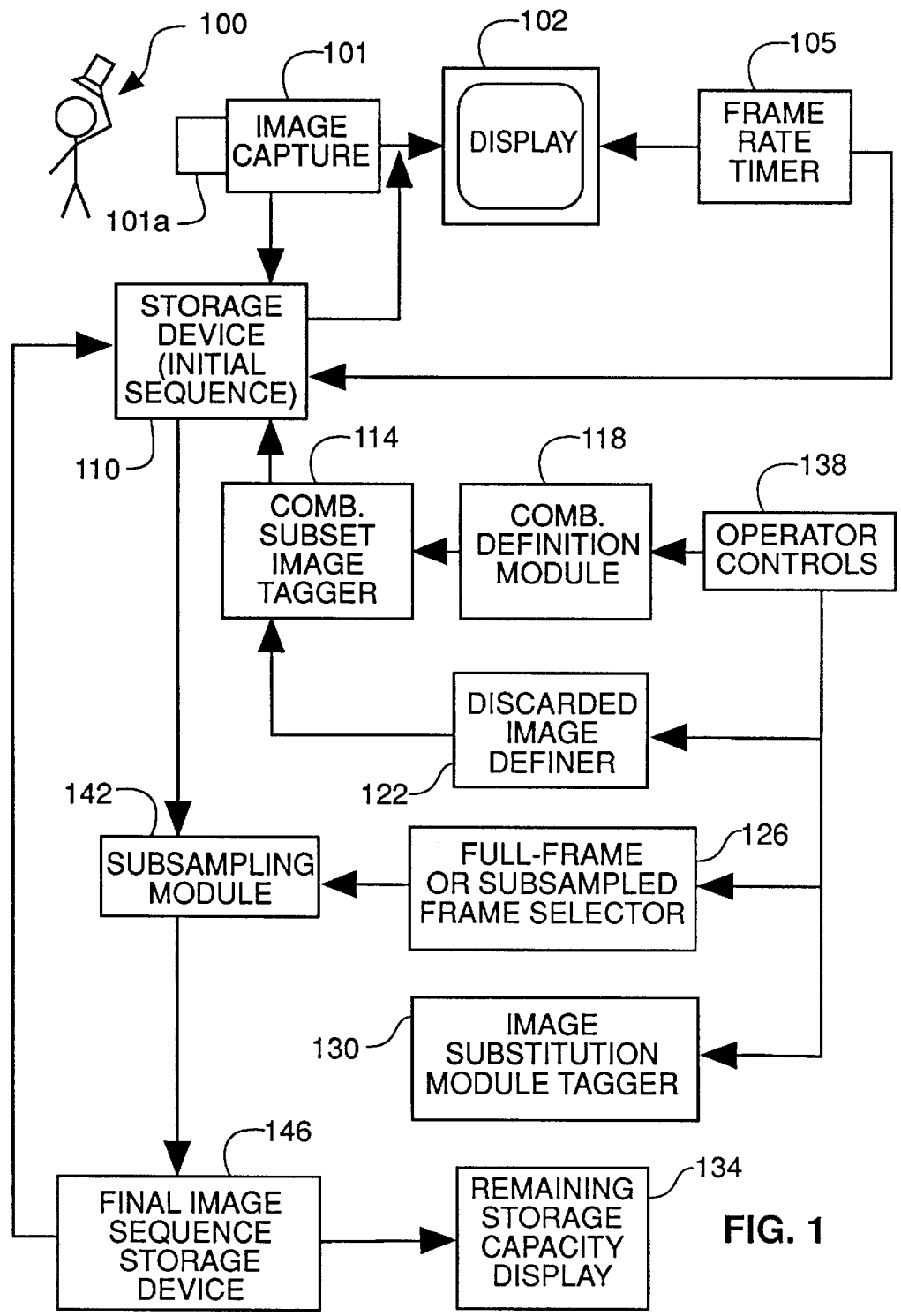
FIG. 1 is a block diagram illustrating a camera of the present invention.

Referring now to the drawings and FIG. 1 in particular, the illustrated block diagram shows the components of a camera of the present invention. All of the components are preferably part of a portable camera preferably of no more than 10 or even less than 5 pounds in weight. A means is provided to connect a portable battery power supply (not shown), which itself is typically less than 1 or 2 pounds in weight. The signal processing components of the camera may be dedicated circuitry or a suitably programmed processor, or any combination of these.

The camera includes a lens 101a through which a motion sequence in a scene 100 can be imaged onto a suitable sensor(s) of an image capture device 101, such as one or more Charge Coupled Devices ("CCD's") with appropriate color filter arrays (in the case of one CCD) or beam splitters and filters (in the case of more than one CCD), in a manner known in camera technology. Preferably, appropriate analog-to-digital ("A/D") converters are provided in image capture device 101 so that it's output is a digital motion image signal (that is, a digital signal corresponding to the motion image). A display 102 is provided to act as a viewfinder and a camera preview screen used in planning and reviewing image frames to be formed into a lenticular image. A first storage 110 stores the captured motion sequence in the form of the motion image signal output by capture device 101, on a suitable storage medium.

A means for defining a comb subset of a motion sequence stored in first storage 110 is also provided. By a "comb subset" in this context, is referenced a series of a subset of frames chosen from throughout the complete series of frames forming the stored motion sequence. The subset will contain less frames than the motion sequence. For example, such a subset might be less than every third, fifth, or tenth frame from a selected stored motion sequence. The comb subset defining means includes comb subset image tagger 114, comb definition module 118, discarded image definer 122, image substitution tagger 130, and operator controls 138. Operator controls 138 allow a user to define a comb subset of a motion image sequence in first storage device 110. This it accomplishes by allowing the user to access a comb definition module 118, which contains in a memory multiple mathematical time relationships which determine respective comb subsets. For example, the mathematical relationships may be a command to select every third, fifth or tenth image from the stored motion image sequence depending upon such variables as the pitch of the lenticules of a lenticular lens with which a final lenticular image is to be used as well as total number of frames in a stored motion image sequence which the user indicates through operator controls 138 s(he) desires to make into a lenticular image. This indication can be provided by the user by specifying to comb definition module 118 through controls 138, the first and last images in a stored motion image sequence which are to be part of the comb subset, and the comb definition module 118 then automatically (that is, machine selected without further user input) select the other frames of the comb subset. This automatic selection would be based on a preselected number of frames permitted in the comb subset and the selected mathematical time relationship.

The preselected number of frames can either be entered manually by a user through controls 138, or determined automatically by comb definition module 118 based on parameters of the lenticular lens sheet and maximum resolution of the printer which will be used to print the lenticular image formed from the comb subset. These parameters can also be entered by the user through operator controls 138 or user selected from previously stored parameters in comb definition module 118 during camera manufacture or by the user. The comb subset image tagger 114 tags those frames in first storage 110 defined by comb definition module 118, as part of a selected comb subset. This can be accomplished by any means of associating the individual frames of the selected comb subset, such as by a common element in a filename or having them copied into a separate directory in first storage device 110.

Frame rate timer 105 acts as a means to allow the user to sequentially replay the frames of a selected comb subset in first storage device 110, through display 102. The rate timer causes the frames of the selected comb subset to be replayed at approximately the same speed they would appear on a lenticular image element using a lenticular image formed from the images of the selected comb subset, as that element was tilted back and forth. Thus, the user is able to obtain a fairly realistic representation on the camera as to what the final lenticular image element incorporating that selected comb subset will look like, and determine if it is acceptable or whether to shoot another motion image sequence while s(he) still has the opportunity. Of course, any other means can be used which will allow the frames of the selected comb subset to be played back in a manner which will emulate the result as viewed on a lenticular image element being tilted back and forth.

A second storage device 146, which may or may not be the same physical device as the first storage device, is provided to store comb subsets of respective motion image sequences stored in first storage device 110, which the user has indicated through operator control 138 are more or less satisfactory. Before storage in second storage device 146, the individual frames can be subsampled by subsampling module 142. Whether frames of a selected comb subset are in fact subsampled or not, is determined by full-frame or subsampled frame selector 126 under the control of operator controls 138. Thus, subsampling module 142 may optionally pass full frames from the first storage device to the second storage device. If second storage device 146 is the same physical device as first storage device 110, subsampling module 142 may then simply do nothing with frames of a selected comb subset stored in first storage device 110 if a user through operator controls 138 and image substitution tagger 130 indicates that no sub-sampling is to be performed. A user may request no sub-sampling through operator controls 138 particularly where s(he) may wish to modify the comb subset selected to be saved in second storage device 146. Additionally, operator controls 138 allow a user to indicate through comb definition module 118 that it is desired to save only a single frame of a captured motion image for later use. In this case, comb subset image tagger 114 has the ability to tag that single frame and move it to second storage device 146, sub-sampled or not. Tagger 114 also provides the means for designating such additional single frames by, for example, providing them with a file name with a unique component (for example, each such single frame could be named beginning with "S" to indicate it is a single frame).

By "sub-sampling" in the foregoing context is referenced selecting for saving in second storage device 146, only a subset of spaced apart lines of each frame of a selected comb subset, which lines will be required for forming the final lenticular image when those lines are interleaved. In this regard, the sampling of lines from each frame of a sequence of images which will be used to form a final lenticular image, is described, for example, in U.S. Pat. No. 5,278,608, U.S. Pat. No. 5,276,478, and U.S. Pat. No. 5,455,689. Thus, the entire full frame of each image of a selected comb subset to be made into a lenticular image, need not be stored on the camera. A remaining storage capacity display 134 allows a user to determine the storage capacity remaining in second storage 146 and optionally also in first storage 110.

An image substitution module tagger 130 allows a user through operator controls 138 to identify any given frame of a selected comb subset stored in second storage device 146, which the user desires to repeat or replace with another image frame, so that the comb subset will provide a lenticular image with the desired look. The user can identify these by replaying a selected comb subset from second image storage device 146 through display 102 in conjunction with rate timer 105, in a manner similar to replaying a comb subset from first storage device 110 as discussed above. It will be understood that if the frames of the comb subset in second image storage 146 selected for replaying has been sub-sampled, display 102 preferably will include appropriate circuitry for identifying this (such as by file name) and replicating lines so that the displayed image fills the screen of display 102. Image substitution module 130 allows the user through controls 138, to replace one or more user specified frames of a selected comb subset stored in second storage 146, with frames from other comb subsets or single frames stored in second storage device 146 or first storage device 110, or to replicate one or more frames of such a comb subset, or add frames from other saved comb subsets or single frames into the selected comb subset.

Where frames are added to the selected comb subset in second storage device 146, discarded image definer 122 preferably operates in conjunction with image substitution module tagger 130, to automatically tag other frames in that selected comb subset in second storage 146, for deletion so that the total number of frames in the selected comb subset remains constant (since the number may be limited by the pitch of the lenticular lens sheet with which a motion lenticular image formed from a comb subset is to be used, as well as by printer resolution). Discarded image definer 122 can either be preset or set through operator controls 138 to delete the necessary number of images from adjacent the added frame(s) or from the end(s) of the selected comb subset or elsewhere in the selected comb subset.

Upon a user indicating through operator controls 138 that unneeded frames can be discarded, discarded image definer 122 also operates to tag any frames in first storage device 110 which have not been tagged as frames of a comb subset, for deletion.

The tagging of frames for deletion by discarded image definer 122 preferably merely causes a change in a characteristic associated with the stored frame (such as filename) which allows that frame to be overwritten when other frames are to be stored on first or second storage devices 110, 146. It will be appreciated though, that discarded image definer 122 could be constructed to cause an actual deletion of the frames to be discarded in first or second storage devices 110 and 146.

Figure 2:
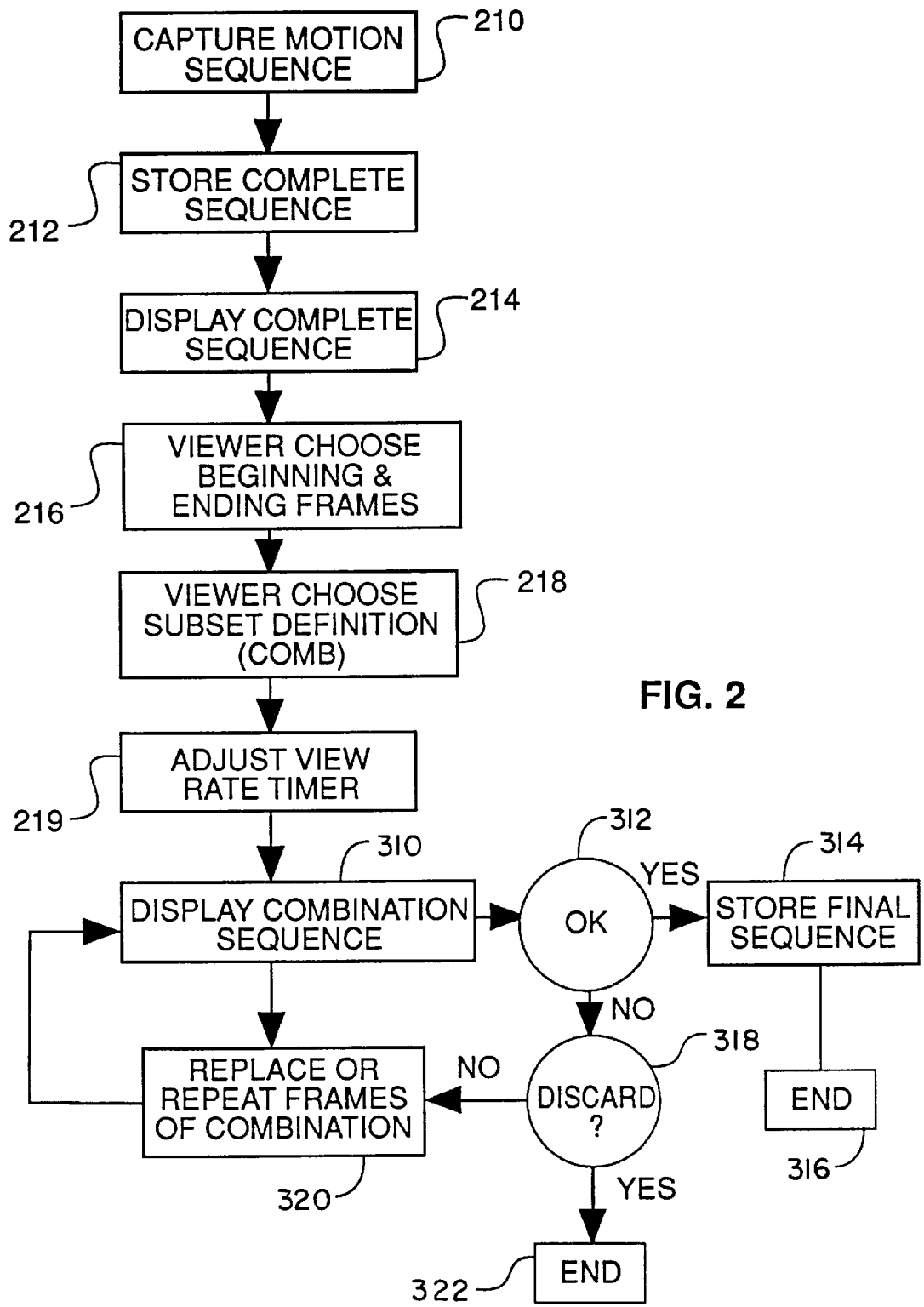
FIG. 2 is a flowchart illustrating a method of the present invention.

A method of the present invention which can be executed on the camera of FIG. 1 will now be described in connection with the flowchart of FIG. 2. However, it will be understood that other apparatus can be constructed to execute the steps of the method. In particular, a motion sequence of a real-life scene 100 is first captured in step 210 by image capture device 101. Such a motion sequence may, for example, simply be a change in the entire scene with respect to the image capture device 101 such as by panning the camera across a stationary scene and/or movement of one or more objects within a given scene with respect to other objects in the scene. The captured motion sequence is then stored in step 212 on first storage device 110. If desired, a viewer through user controls 138 may have the complete motion sequence displayed in step 214 on display 102. If the viewer is satisfied with the complete motion sequence, s(he) may then begin defining the comb subset of the scene which will be used to form a lenticular image. In a preferred application, a first step of this defining is done by the user choosing begin and end frames in step 216 from the motion sequence, using operator controls 138. The user may then choose subset definition in step 218 one of the mathematical time relationships stored in comb definition module 118 so as to automatically define the remainder of the frames of the comb subset. Comb subset image tagger 114 then tags all the selected frames as being members of a single identified comb subset, such as by generating a file which specifies those frames which are members of a given comb subset, or by naming the frames with file names that identify them as belonging to a given comb subset, or by placing those frames in their own directory. This identification will also be saved on second storage means with the final comb subset (the generation of which is discussed below).

Frame rate timer 105 may then be adjusted as per step 219 by a user for a time period that is expected to equal the time period over which all of the frames on a motion lenticular image formed from the comb subset will be viewed. For example, where it is expected that all frames will be viewed on a card that is tilted over a range of angles with respect to a user's eyes over a time period of 2 seconds, frame rate timer 105 will be adjusted for 2 seconds. However, it will be appreciated that for this parameter, as is the case for other variable parameters, a default value can be stored in memory of frame rate timer 105 and adjusted by the user only if s(he) deems it necessary. When frame rate timer 105 is set to a satisfactory value, the frames of the comb sequence may then be displayed per step 310 on display 102.

The user, after viewing the frames of the comb subset on display 102, then decides per step 312 if s(he) is completely satisfied with the comb subset or not. If the user decides that the comb subset is fine, s(he) indicates on operator controls 138 that this is a final comb subset which should be stored at step 314. This causes the comb subset to be stored in second storage device 146. As described above, subsampling can be performed or not on the stored frames prior to being stored in second storage 146, under the control of full-frame or subsampled frame selector 126 and operator controls 138. Preferably, if the user is fairly confident no further changes will be made to the comb subset, then sub-sampling is performed since this will considerably reduce the storage requirements for the comb subset. When storage in second storage device 146 is complete, the procedure is completed per step 316. However, the user can at this point or any other point, indicate through operator controls 138 that use of the image sequence from which the comb subset now stored in second storage device 146 was formed, is complete. In this case discarded image definer 122 causes the frames of that sequence in first storage device 110 to be marked for deletion.

If the user decides per step 312 after viewing the frames of the comb subset on display 102, that s(he) is not completely satisfied with the comb subset s(he) then decides per step 318 whether to modify the comb subset or discard it completely and start again. If it is elected through operator controls 138 to discard the comb subset, comb definition module 118 causes comb subset image tagger 114 to de-tag the frames of that comb subset (that is, remove the identification of them as being frames of a comb subset, although they still remain frames of the image sequence from which they came unless that image sequence is identified by the user for deletion). In this case, the method is terminated per step 322 and the user can again define another comb subset from the image sequence or elect to capture a new image sequence.

However, if the user decides per step 318 that s(he) is more or less satisfied with the comb subset, this is indicated on operator controls 138 which then causes the comb subset to be stored in second storage device 146. Modification of the comb subset can be performed by repeating or replacing frames of the comb subset per step 320. It will also be appreciated that alternatively new frames could be added to the comb subset. The frames to be repeated or replaced are identified through operator controls 138 and image substitution tagger. In either case the operator identifies the frame(s) of interest, whether they are to be repeated and if so how many times, or if they are to be replaced or if new frames are to be added then which frames are to be used for the replacing or for adding. For example, other frames from the image sequence from which that first comb subset was taken can be used, or single frames stored in second storage device 146 can be used. Frames from other comb subsets stored in second storage 146 could also be used, although if they are stored in subsampled form it may be necessary to discard some frames from the first comb subset so that the total number of frames will equal the number of frames viewable under the lenticular faceplate. Preferably the number of frames should be maintained constant since when the comb subset was originally defined as described above, the number of frames would have been determined as a function of the lenticular pitch and printer resolution parameters. As described above, this can be accomplished automatically by discarded image definer 122 operating in conjunction with image substitution module tagger 130, to automatically tag other frames in the first comb subset in second storage 146 for deletion. Various schemes can be employed for deleting the necessary number of frames. For example, one or more frames can be deleted from either or both ends of the comb subset or intermediate the ends, or discarded image definer 122 can cause comb definition module 118 to replace frames of the first comb subset with new frames based on a new mathematical time relationship from comb definition module 118.

When the desired repetition, replacement or addition of frames is completed to the comb subset, the modified comb subset can then again be displayed prestep 310 on display 102. The user can then again decide at step 312 if s(he) is satisfied with the modified comb subset and, if so, store it at step 314 as a final comb subset, or again go through the loop of step 318, 320, 312, and 310. When the user is finally satisfied with a modified comb subset, it is stored at step 314 on second storage device 146 as a final comb subset.

It will be appreciated that following the above procedure, one or more final comb subsets from one or more respective motion image sequences, can be stored as desired in second storage device 146. Different mathematical time relationships may have been used to select the remaining frames of each comb subset, following selection of at least one frame (and preferably the first and last frames) by the user. Also, as described above, operator controls 138 can be used to cause frames in first storage device 110 to be deleted. Thus, storage space on the camera is saved. Furthermore, when subsampling is performed by subsampling module 142, only selected lines of each frame are stored in second storage 146 thereby further reducing storage space requirements on the camera.

Motion lenticular images can then be prepared outside the camera by uploading corresponding comb subsets in second storage device 146 to a suitably programmed digital computer, which can then interleave lines from the frames in a known manner as mentioned above. If the frames of any comb subset were not saved in sub-sampled format, the programmed computer would have to do the necessary sub-sampling in a known manner. Each of the motion lenticular images so formed can either then be printed and aligned with a corresponding lenticular lens sheet (with the interleaved lines being parallel with the lenticules), or the motion lenticular image can be printed in alignment with the lenticules directly on the back of a lenticular lens sheet, to form a corresponding motion lenticular element. At this point it will be appreciated that if the sub-sampled lines were horizontal lines with respect to the normal viewing position of the corresponding motion image sequence, the lenticular element would normally be viewed with the lenticules in a horizontal orientation for a person standing upright, and tilted back and forth about a horizontal axis so that the person could view each of the comb subset frames making up the motion lenticular image. If the sub-sampled lines were vertical with respect to the normal viewing position of the corresponding motion image sequence, the lenticular element would normally be viewed with the lenticules in a vertical orientation for a person standing upright, and swung back and forth about a in a vertical axis so that the person could view each of the comb subset frames making up the motion lenticular image. It will be recognized that such conditions correspond to those required for creating a depth image (that is, one exhibiting apparent three-dimensional effect). Such a depth image can be created, for example, by panning the camera horizontally in front of a stationary or motion scene.

First storage 110 and second storage 146 may, for example, be constructed to operated with any suitable storage medium, such as solid state digital memory, magnetic or optical storage medium (for example, a magnetic or optical tape or disk or photographic film). It is preferred that second storage device store on a medium which is removable and replaceable. Where the first and second storage are the same physical device then the storage medium for both is preferably of the removable and replaceable type. For example, a removable magnetic or optical disk could be used. Storage on magnetic storage cards, such as described in U.S. Pat. No. 5,436,970, could also be used. It will also be appreciated that the camera can store on first or second storage devices 110, 146, in association with a stored image sequence or combed subset, additional information of value to the user. such as time and place the sequence or subset for captured or created. Additionally, known methods of image compression, such as the hierarchical structure used in Kodak PhotoCD can also be employed to improve storage capacity, as well as known techniques of motion image compression.

The invention has been described with reference to a preferred embodiment. However, it will be appreciated that variations and modifications can be effected by a person of ordinary skill in the art without departing from the scope of the invention.

We claim:

1. A camera for recording motion sequences which may be selected for forming an integral image, comprising:
   (a) image capture means for capturing a scene action as a motion sequence of image frame signals;
   (b) a first storage means for storing the motion sequence;
   (c) means for defining a comb subset of the motion sequence; and
   (d) a second storage means which may be the same or different from the first storage means, for automatically storing a selected comb subset of the motion sequence; wherein said means for defining allows a user to select a begin frame and an end frame of the comb subset then automatically selects the other frames of the comb subset based on a preselected number of frames permitted in the comb subset and a mathematical time relationship of the comb subset.

2. A camera according to claim 1 additionally comprising:
   a camera preview screen; and
   a means for sequentially displaying on the camera preview screen, the frames of the comb subset prior to storage in the second storage means.

3. A camera according to claim 1 wherein said means for defining allows a user to select a mathematical time relationship between multiple mathematical time relationships in defining the comb subset.

4. A camera according to claim 3 wherein said means for defining further allows a user to replace individual frames of the comb subset determined by said selected mathematical time relationship with other frames of the motion sequence.

5. A camera according to claim 1 wherein the means for defining the comb subset allows a user to designate selected stored frames which will be repeated within the comb subset.

6. A camera according to claim 1 additionally comprising an identification means which stores in the second storage means, an identification of those stored frames which are members of the comb subset.

7. A camera according to claim 1 additionally comprising line selection means for selecting only a subset of spaced apart lines of each frame in the comb subset which are stored in the second storage means, so that a lenticular image can be formed from interleaving the stored lines of the comb subset.

8. A camera for recording motion sequences which may be selected for forming an integral image, comprising:
   (a) image capture means for capturing a scene action as a motion sequence of image frame signals;
   (b) a first storage means for storing the motion sequence;
   (c) means for defining a comb subset of the motion sequence; and
   (d) a second storage means which may be the same or different from the first storage means, for automatically storing a selected comb subset of the motion sequence; additionally comprising a means to delete from the first storage means frames of the motion sequence not utilized in the stored comb subset.

9. A method according to claim 7 wherein said comb subset has a preselected number of frames and additionally comprising automatically maintaining the number of frames in the comb subset constant.

10. A method according to claim 9 wherein the number of frames is maintained constant by deleting one or more frames from an end of the comb subset.

11. A method according to claim 9 wherein the number of frames is maintained constant by deleting one or more frames intermediate the ends of the comb subset.

12. A method according to claim 9 wherein the number of frames is maintained constant by adjusting a mathematical time relationship of the frames of said comb subset.

13. A camera for recording motion sequences which may be selected for forming an integral image, comprising:
   (a) image capture means for capturing a scene action as a motion sequence of image frame signals;
   (b) a first storage means for storing the motion sequence;
   (c) means for defining a comb subset of the motion sequence; and
   (d) a second storage means which may be the same or different from the first storage means, for automatically storing a selected comb subset of the motion sequence; additionally comprising:
      means for selecting for storage on the second storage means, additional frames of the motion sequence not saved as frames of the comb subset; and
      identification means for designating the additional frames when stored in the second storage means.

14. A camera for recording motion sequences which may be selected for forming an integral image, comprising:
   (a) image capture means for capturing a scene action as a motion sequence of image frame signals;
   (b) a first storage means for storing the motion sequence;
   (c) means for defining a comb subset of the motion sequence; and
   (d) a second storage means which may be the same or different from the first storage means, for automatically storing a selected comb subset of the motion sequence; additionally comprising means for selectively deleting a motion sequence from the first storage means, wherein said means for selectively deleting allows selection of the first and last image frames of the motion sequence to be deleted.

15. A method of forming an integral image, comprising:
   (a) selecting a frame of a comb subset of a motion sequence of image frame signals;
   (b) automatically selecting the remaining frames of the comb subset based on a preselected number of frames permitted in the comb subset and a mathematical time relationship of the comb subset;
   (c) sequentially displaying on a preview screen, the frames of the comb subset;
   (d) generating a lenticular image by interleaving lines from the frames of the comb subset; and
   additionally comprising replacing at least one frame of the comb subset determined by said mathematical time relationship of the comb subset with another frame of the motion sequence prior to generating the lenticular image.

16. A method according to claim 15 wherein the selecting step comprises selecting a begin and end frames.

17. A method according to claim 15 wherein steps (a) to (d) are repeated to obtain different comb subsets of one or more motion sequences of image frame signals, and different mathematical time relationships are used to select the remaining frames of respective comb subsets.

18. A method according to claim 15 additionally comprising repeating a frame within the comb subset.

* * * * *